(12) United States Patent
Yoo et al.

(10) Patent No.: US 9,378,134 B2
(45) Date of Patent: Jun. 28, 2016

(54) NON-VOLATILE MEMORY DEVICE CAPABLE OF MINIMIZING INSTANT CURRENT CONSUMPTION AND PERFORMING MEMORY OPERATIONS IN PARALLEL, AND METHOD FOR OPERATING THE SAME, AND SYSTEM INCLUDING THE SAME

(71) Applicant: SK hynix Inc., Gyeonggi-do (KR)

(72) Inventors: Byoung-Sung Yoo, Gyeonggi-do (KR); Eui-Jin Kim, Gyeonggi-do (KR); Jun-Rye Rho, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 237 days.

(21) Appl. No.: 14/103,505

(22) Filed: Dec. 11, 2013

(65) Prior Publication Data
US 2014/0359204 A1    Dec. 4, 2014

(30) Foreign Application Priority Data
May 31, 2013   (KR) .................. 10-2013-0062465

(51) Int. Cl.
*G06F 12/02*    (2006.01)

(52) U.S. Cl.
CPC .... *G06F 12/0246* (2013.01); *G06F 2212/7209* (2013.01)

(58) Field of Classification Search
CPC . G06F 13/1694; G06F 13/24; G06F 13/4022; G06F 13/4243; G06F 13/1668; G06F 12/0246; G06F 12/0811; G06F 3/0634; G06F 3/0673; G06F 11/1441; G06F 1/3225; G06F 1/3268; G06F 1/3275; G06F 3/0679

USPC ................ 711/103, E12.001, E12.008, 154, 711/E12.002, E12.017, E12.103, 118, 119, 711/162, 203; 365/189.011; 710/14, 3, 104, 710/48
See application file for complete search history.

(56) References Cited

U.S. PATENT DOCUMENTS

| 7,505,320 | B2 | 3/2009 | Li | |
|---|---|---|---|---|
| 8,495,400 | B2 * | 7/2013 | Fulkerson | G06F 1/3203 711/118 |
| 2008/0005455 | A1 * | 1/2008 | Macri | G06F 1/3225 711/105 |
| 2008/0019196 | A1 * | 1/2008 | Lin | G11C 7/1045 365/193 |
| 2011/0145609 | A1 * | 6/2011 | Berard | G06F 1/3203 713/320 |
| 2011/0314221 | A1 * | 12/2011 | Kawada | G06F 11/1456 711/114 |
| 2012/0089796 | A1 * | 4/2012 | Fukazawa | G06F 11/1441 711/162 |
| 2012/0233394 | A1 * | 9/2012 | Liu | G06F 12/0804 711/105 |
| 2013/0080858 | A1 * | 3/2013 | Lee | G11C 16/349 714/773 |

FOREIGN PATENT DOCUMENTS

KR    1020090068616    6/2009

* cited by examiner

*Primary Examiner* — Yaima Rigol
*Assistant Examiner* — Edward Waddy, Jr.
(74) *Attorney, Agent, or Firm* — IP & T Group LLP

(57) ABSTRACT

Disclosed are a non-volatile memory device capable of performing memory operations in parallel and a method for operating the non-volatile memory device, and a system including the non-volatile memory device. A non-volatile memory system may include a memory controller suitable for controlling a memory; and the memory suitable for performing read and program operations in response to commands from the memory controller, and wherein the memory controller and the memory operate in a high interface mode, and operate in a low interface mode when an operation to read internal data or an operation to receive (N+1)th data is performed during an operation to program Nth data in the memory.

20 Claims, 8 Drawing Sheets

FIG. 8

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| PV1 | | | | | | | | | | | | | | | | | | | | | | | |
| PV2 | | | | | | | | | | | | | | | | | | | | | | | |
| PV3 | | | | | | | | | | | | | | | | | | | | | | | |

| ISPP STEP 300MV | NPULSE | PGM PULSE | VRF PULSE | TOTAL |
|---|---|---|---|---|
| PGM PV1 PULSE | 4 | 264.4 | 188.8 | 453.2 |
| PGM PV 1,2 PULSE | 4 | 264.4 | 277.6 | 542 |
| PGM PV 1,2,3 PULSE | 2 | 132.2 | 161 | 293.2 |
| PGM PV 2,3 PULSE | 6 | 396.6 | 349.8 | 746.4 |
| PGM PV 3 PULSE | 7 | 462.7 | 252.7 | 715.4 |

| CASE | ITEM | tRC/tWC | PAGE BUFFER | IO TIME | | TOTAL(DATA INPUT/OUTPUT) | PULSE TIME |
|---|---|---|---|---|---|---|---|
| 2 | IMPLEMENTATION 1 | 16ns | 16K | Input | 262.144us | 524.288us | (715.4+746.4)us |
| | | | | Output | 262.144us | | |
| | IMPLEMENTATION 2 | 16ns | 16K | Input | 262.144us | 524.288us | 715.4us |
| | | | | Output | 262.144us | | |
| 1 | IMPLEMENTATION 1 | 16ns | 16K | Input | 262.144us | 262.144us | (715.4+746.4)us |
| | IMPLEMENTATION 2 | 16ns | 16K | Input | 262.144us | 262.144us | 715.4us |

NON-VOLATILE MEMORY DEVICE CAPABLE OF MINIMIZING INSTANT CURRENT CONSUMPTION AND PERFORMING MEMORY OPERATIONS IN PARALLEL, AND METHOD FOR OPERATING THE SAME, AND SYSTEM INCLUDING THE SAME

CROSS-REFERENCE TO RELATED APPLICATION

The present application claims priority of Korean Patent Application No. 10-2013-0062465, filed on May 31, 2013, which is incorporated herein by reference in its entirety.

BACKGROUND

1. Field

Exemplary implementations of the present invention relate to semiconductor design technology, and more particularly, to a non-volatile memory device capable of performing memory operations in parallel and a method for operating the non-volatile memory device, and a system including the non-volatile memory device.

2. Description of the Related Art

Recently, there is an increasing demand for non-volatile memory devices that can be electrically programmed and erased and that do not need a refresh function to rewrite data at specific intervals. Furthermore, in order to develop a large-capacity memory device capable of storing a large amount of data, active research is being carried out on technology for the high degree of integration of memory devices. Here, programming refers to an operation of writing data into a memory cell, and erasing refers to an operation of erasing data written into a memory cell.

In order to increase the degree of integration of memory devices, a NAND flash memory device, in which a plurality of memory cells are coupled in series (i.e., a structure in which a drain or a source is shared by adjacent cells), thus forming one string, has been developed. Unlike a NOR flash memory device, the NAND flash memory device sequentially may read data. The programming and erasing of the NAND flash memory device are performed by controlling the threshold voltage of a memory cell while electrons are injected into or discharged from the floating gate of the memory cell using an F-N tunneling method.

Meanwhile, write amplification (WA) refers to a difference between the amount of physical data transmitted from a host to a flash memory device to be written and the amount of logical data used within the flash memory device. The reason why there is a difference between the amount of physical data and the amount of logical data is due to the basic operation of the flash memory device, in which writing is performed by the page, whereas erasing is performed by the block. The difference may also be due to an operation, such as a wear-leveling operation or a garbage collection operation performed to improve performance within the flash memory device. This is because data needs to be moved or rewritten within the flash memory device irrespective of the amount of data supplied from the host. For example, referring to FIG. 1, assuming that the amount of physical data transmitted from a host to a flash memory device in order to be written is 4 Kb, the amount of logical data written within the flash memory device can be 16 Kb.

For these reasons, it is necessary to minimize an operation, such as the movement of data or rewriting that can become the cause of WA. However, the number of operations, such as the movement of data and rewriting that can become the cause of WA, is increased because the size of the page buffer of a recent flash memory device is increased.

From a graph (A) of FIG. 2, it can be seen that a relatively large amount of time is consumed if the read and output of data, the input of data, and a program are continuously performed within a flash memory device.

Accordingly, as shown in graph (B) of FIG. 2, a scheme of performing a parallel input of data in an operation section, in which data is programmed, can be suggested to reducing the consumed time. Likewise, as shown in a graph (C) of FIG. 2, a scheme for outputting and inputting of data in parallel, in an operation section in which data is programmed, is suggested.

In order to apply a scheme, such as that shown in the graph (B), to a flash memory device, however, a cache operation must be performed through an additional buffer, such as a cache buffer, while a program operation is performed. This scheme is problematic in that a large current consumption may be generated. That is, there may be a problem in that a large current may be generated because the two operations must be performed at the same time. This problem may become severe, as a flash memory device operates at higher speed.

Furthermore, if a scheme, such as that shown in the graph (C), is applied to a flash memory device, a large current consumption may be generated. Therefore, the scheme shown in graph (C) of FIG. 2 cannot be implemented in an existing flash memory device because a program operation and a data read operation cannot be performed at the same time. That is, since a program operation and a read operation are directly connected to memory cell arrays and performed in an existing flash memory device, the execution of the read operation during the program operation or the execution of the program operation during the read operation is physically impossible.

SUMMARY

An exemplary implementation of the present invention is directed to a non-volatile memory device capable of minimizing instant current consumption and also performing memory operations in parallel and a method for operating the non-volatile memory device, and a system including the non-volatile memory device.

In accordance with an exemplary implementation of the present invention, a non-volatile memory system may include a memory controller suitable for controlling a memory; and the memory suitable for performing read and program operations in response to commands from the memory controller, and wherein the memory controller and the memory operate in a high interface mode, and operate in a low interface mode when an operation to read internal data or an operation to receive (N+1)th data is performed during an operation to program Nth data in the memory.

In accordance with another exemplary implementation of the present invention, a method for operating a non-volatile memory device may include a first mode setting step of setting a high interface mode; a first latch step of receiving and latching Nth data; a program step of programming the Nth data into a memory array; a second latch step of switching to a low interface mode when (N+1)th data is received during the program step and latching the received (N+1)th data; a read step of switching to the low interface mode in response to a read command received during the program step and reading internal data programmed into the memory array; and a second mode setting step of setting the high interface mode after the second latch step or the read step is completed.

The method may further comprise a temporary suspension step of suspending the program step before switching to the low interface mode, when the read step is entered; and a program continuation step of entering the second mode setting step and simultaneously performing the program step suspended in the temporary suspension step, when the second mode setting step is entered in response to a completion of the read step.

The method may further comprise a step of outputting the internal data, read in the read step, externally in a section in which the program continuation step is performed.

The method may further comprise a second program step of programming the (N+1)th data, latched in the second latch step, into the memory array after completing the program step, when the second mode setting step is entered in response to a completion of the second latch step.

A region of the memory array into which the Nth data may be programmed in the program step, a region of the memory array into which the (N+1)th data may be programmed in the second program step, and a region of the memory array from which the internal data may be read in the read step are different.

In accordance with yet another exemplary implementation of the present invention, a non-volatile memory device may include a memory array; a main buffer suitable for programming Nth or (N+1)th data, continuously supplied externally, into the memory array; a cache buffer suitable for copying the Nth or the (N+1)th data to and from the main buffer, reading internal data from the memory array, receiving the external Nth or the (N+1)th data, and outputting the internal data externally; and a control unit suitable for performing the operation to program the Nth or the (N+1)th data and the operation to read the internal data in a high interface mode in response to a program command and a read command, wherein the control unit switches switch to a low interface mode if the operation to read the internal data or the operation to receive the (N+1)th data needs to be performed during the operation to program the Nth data.

In accordance with still another exemplary implementation of the present invention, a non-volatile memory device may include a memory array; a main buffer suitable for programming Nth or (N+1)th data, continuously supplied externally, into the memory array or reading internal data from the memory array; a cache buffer suitable for copying the Nth or the (N+1)th data and the internal data to and from the main buffer, receiving the external Nth or the (N+1)th data, and outputting the internal data externally; a dummy buffer suitable for copying the Nth or the (N+1)th data to and from the main buffer; and a control unit suitable for performing the operation to program the Nth or the (N+1)th data and the operation to read the internal data in a high interface mode in response to a program command and a read command, wherein the control unit switches to a low interface mode if the operation to read the internal data or the operation to receive the (N+1)th data needs to be performed during the operation to program the Nth data.

A region of the memory array into which the Nth data may be programmed, a region of the memory array into which the (N+1)th data may be programmed, and a region of the memory array from which the internal data may be read are different.

The operation to program the Nth or the (N+1)th data, the operation to read the internal data, and the operation to receive the Nth or the (N+1)th data may be performed when the cache buffer is empty.

BRIEF DESCRIPTION OF THE DRAWINGS

FIG. 8 is a table illustrating effects according to the operations of the non-volatile memory devices of FIGS. 3 to 7 in accordance with an embodiment of the present invention.

DETAILED DESCRIPTION

Figure 1:
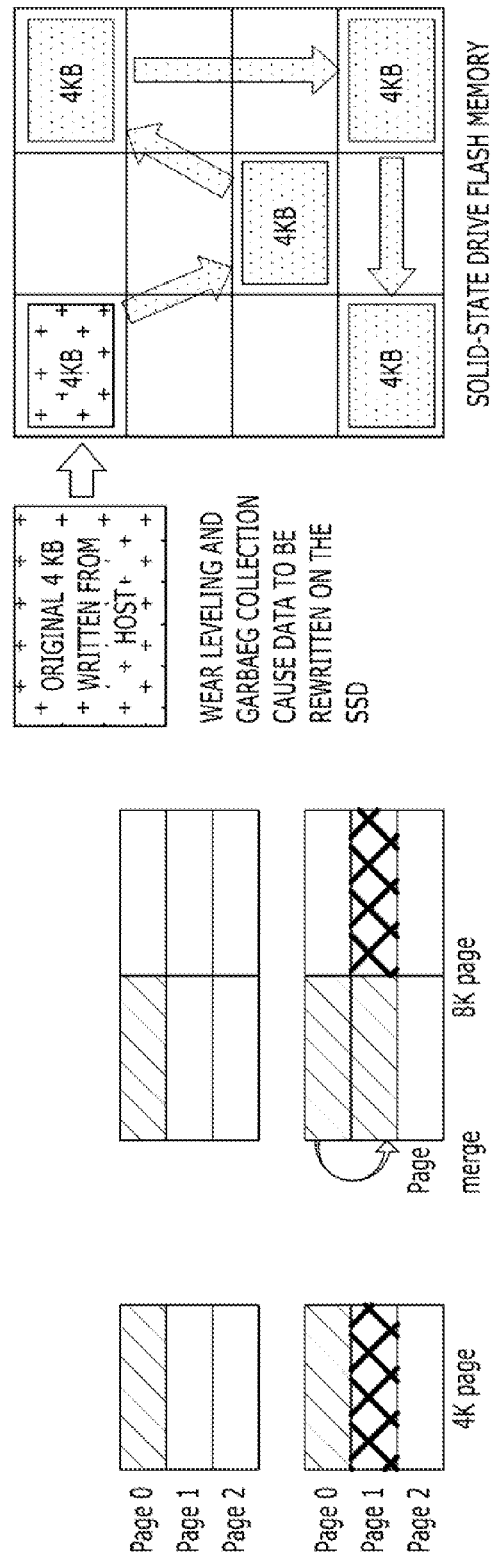
FIG. 1 is a diagram illustrating the Write Amplification (WA) of a conventional flash memory device.
Figure 2:
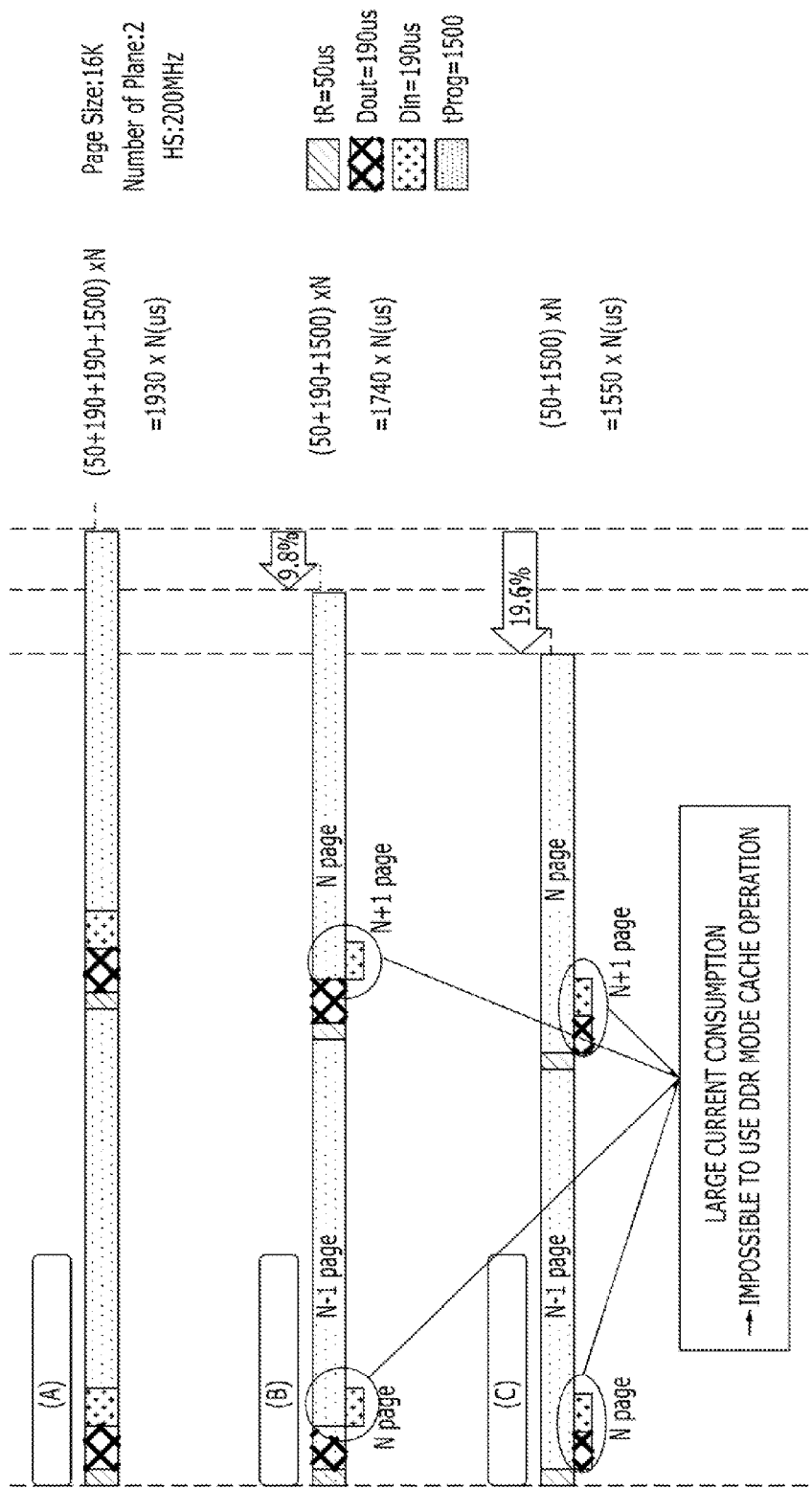
FIG. 2 is a diagram illustrating a time difference attributable to a difference between the operating methods of a conventional flash memory device.

Exemplary implementations of the present invention will be described below in more detail with reference to the accompanying drawings. The present invention may, however, be embodied in different forms and should not be construed as being limited to the exemplary implementations set forth herein. Rather, these exemplary implementations are provided so that this disclosure will be thorough and complete, and will fully convey the scope of the present invention to those skilled in the art. Throughout the disclosure, reference numerals correspond directly to the like numbered parts in the various figures and exemplary implementations of the present invention.

Figure 3:
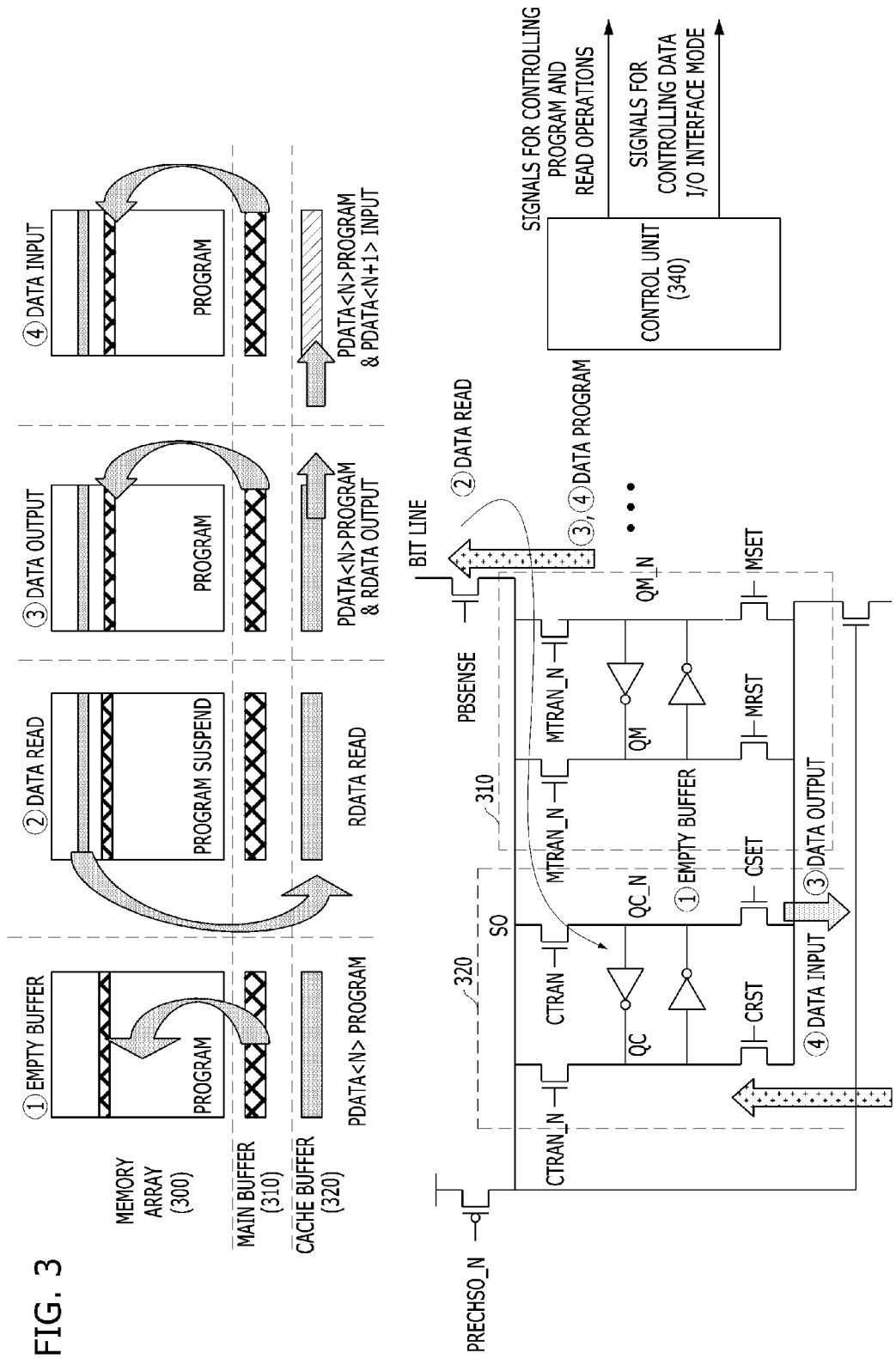
FIG. 3 is a diagram showing an exemplary non-volatile memory device.

FIG. 3 is a diagram showing an exemplary non-volatile memory device.

Referring to FIG. 3, the exemplary non-volatile memory device may include a memory array 300, a main buffer 310, a cache buffer 320, and a control unit 340.

The memory array 300 may store data by the page and may input and output data with the main buffer 310 and the cache buffer 320 through a data program operation and a data read operation. For reference, in the conventional art, the non-volatile memory has been illustrated as being a NAND flash memory device, but this is only illustrative. A memory array 300, of the exemplary non-volatile memory device, may include NAND flash memory cells, NOR flash memory cells, or the memory cells of non-volatile memory devices, such as PRAM, MRAM, or RRAM.

The main buffer 310 may program Nth data PDATA<N> or (N+1)th data PDATA<N+1>, which may be continuously received from the outside, into the memory array 300. That is, if the Nth data PDATA<N> has been latched in the main buffer 310, then the main buffer 310 may store the Nth data PDATA<N> in a program operation section in the memory array 300. Likewise, if the (N+1)th data PDATA<N+1> has been latched in the main buffer 310, the main buffer 310 may store the (N+1)th data PDATA<N+1> in the memory array 300 in a program operation section.

The cache buffer 320 may copy the Nth data PDATA<N> or the (N+1)th data PDATA<N+1> to and from the main buffer 310, read internal data RDATA from the memory array 300, receive the Nth data PDATA<N> or (N+1)th data PDATA<N+1> from the outside, and output the internal data RDATA to the outside. More particularly, if the cache buffer 320 is empty and the Nth data PDATA<N> or the (N+1)th data PDATA<N+1> is received from the outside, then the cache buffer 320 may latch the received Nth data PDATA<N> or (N+1)th data PDATA<N+1> The Nth data PDATA<N> or the (N+1)th data PDATA<N+1>, which is latched in the cache buffer 320, as described above, may be copied to and from the main buffer 310. Furthermore, if the cache buffer 320 is empty, then the cache buffer 320 may be used to read the internal data RDATA from the memory array 300 in a read operation section and latch the read internal data RDATA. After the internal data RDATA is latched in the cache buffer 320, as described above, the cache buffer 320 may output the internal data RDATA to the outside in a data output operation section.

The control unit 340 may perform an operation of programming the Nth data PDATA<N> or the (N+1)th data PDATA<N+1> and an operation to read the internal data RDATA in a high interface mode, in response to a program command PROG_CMD and a read command RD_CMD. If an operation to read the internal data RDATA or an operation to receive the (N+1)th data PDATA<N+1> needs to be performed while an operation of programming the Nth data PDATA<N> is performed, then the control unit 340 may switch the non-volatile memory device from the high interface mode to a low interface mode. More particularly, in response to the program command PROG_CMD, the control unit 340 may copy the Nth data PDATA<N> or the (N+1)th data PDATA<N+1>, supplied to the cache buffer 320, to the main buffer 310 and then programs the Nth data PDATA<N> or the (N+1)th data PDATA<N+1> into the memory array 300 in the high interface mode. Furthermore, in response to the read command RD_CMD, the control unit 340 may read the internal data RDATA in the cache buffer 320 and outputs the read internal data RDATA to the outside in the high interface mode. However, if an operation to read the internal data RDATA needs to be performed while an operation of programming the Nth data PDATA<N> is performed, the control unit 340 suspends the operation of programming the Nth data PDATA<N>, may switch the non-volatile memory device from the high interface mode to the low interface mode, and may perform the operation to read the internal data RDATA. Thereafter, if the operation to read the internal data RDATA is completed, the control unit 340 may switch the non-volatile memory device from the low interface mode to the high interface mode and may perform the suspended operation of programming the Nth data PDATA<N> again. Here, the reason why the operation of programming the Nth data PDATA<N> needs to be suspended prior to the operation section in which the internal data RDATA is read is that program operation and the read operation cannot be performed at the same time in the memory array 300. This is because the memory array 300 is shared by the main buffer 310 and the cache buffer 320. Furthermore, the reason why the non-volatile memory device needs to switch from the high interface mode to the low interface mode is that a peak current can increase significantly if the read operation is redundantly performed during the suspension of the program operation in a high-speed operating state.

Furthermore, if an operation to receive the (N+1)th data PDATA<N+1> needs to be performed while an operation of programming the Nth data PDATA<N> is performed, then the control unit 340 may switch the non-volatile memory device from the high interface mode to the low interface mode and may perform the operation to receive the (N+1)th data PDATA<N+1>. After the operation to receive the (N+1)th data PDATA<N+1> is completed, the control unit 340 may switch the non-volatile memory device from the low interface mode to the high interface mode again. The reason why the operation of programming the Nth data PDATA<N> does not need to be suspended in the operation section in which the (N+1)th data PDATA<N+1> is received, is that the operation of programming the Nth data PDATA<N> is an operation performed between the main buffer 310 and the memory array 300 and the operation to receive the (N+1)th data PDATA<N+1> is an operation performed between the cache buffer 320 and the outside of the non-volatile memory device. Furthermore, the reason why the non-volatile memory device needs to switch from the high interface mode to the low interface mode is that a peak current can increase significantly if the program operation and the data input operation are performed at the same time in a high-speed operating state.

Here, the operation of the control unit 340, which switches the non-volatile memory device from the high interface mode to the low interface mode, and then switches the non-volatile memory device from the low interface mode to the high interface mode again, may be provided in such a manner that a frequency of an operating clock may be shifted in the state in which the operation has been synchronized with the operating clock. Furthermore, the operation of the control unit 340, which switches the non-volatile memory device from the high interface mode to the low interface mode, and then switches the non-volatile memory device from the low interface mode to the high interface mode again, may be provided in such a manner that the non-volatile memory device may be slowly driven in the state in which the operation has not been synchronized with the operating clock. That is, if an internal operation is slowly performed, irrespective of a toggling of the operating clock, while the non-volatile memory device operates in the low interface mode, an increase of a peak current attributable to the suspension of a program operation, the redundant execution of a read operation, or the redundant execution of a program operation and a data input operation may be suppressed, even in a state in which the operating clock has a high frequency. Here, the non-synchronization state with the toggling of the operating clock is performed only in the low interface mode. If the non-volatile memory device switches from the low interface mode to the high interface mode, then the operation will be synchronized with the operating clock again and performed.

Furthermore, the internal data RDATA read in the cache buffer 320, in the section in which the operation of programming the Nth data PDATA<N> is suspended by the control unit 340, may be outputted to the outside in a section performed after the operation of programming the Nth data PDATA<N>. That is, the operation of programming the Nth data PDATA<N> and the operation of outputting the internal data RDATA to the outside may be redundantly performed. In this case, the non-volatile memory device may not need to operate in the low interface mode because an increase of an instant peak current due to the redundant operations is below a certain level. If it is difficult to rapidly perform the operation of switching the non-volatile memory device from the low interface mode to the high interface mode during the program operation started again after the program operation is suspended, the operation of programming the Nth data PDATA<N> and the operation of outputting the internal data RDATA to the outside may be redundantly performed in the low interface mode.

In summary, if the internal data RDATA needs to be read or the (N+1)th data PDATA<N+1> needs to be received while the Nth data PDATA<N> is programmed, then the non-volatile memory device essentially may switch from the high interface mode to the low interface mode in order to suppress an increase of an instant peak current. A point of time at which the operation of switching the non-volatile memory device from the low interface mode to the high interface mode again is performed may selected based on the requirements of the non-volatile memory device.

Furthermore, the (N+1)th data PDATA<N+1> that is inputted to the cache buffer 320 may be copied to the main buffer 310 and programmed into the memory array 300, after the operation of programming the Nth data PDATA<N> is terminated. This means that the (N+1)th data PDATA<N+1> may remain latched in the cache buffer 320, in an operation section in which the Nth data PDATA<N> is programmed. In the state in which data has been latched in the cache buffer 320 as described above, an operation of additionally inputting/outputting data to/from the cache buffer 320 cannot be performed. That is, an operation to read the internal data RDATA and an operation to receive the Nth data PDATA<N> or the (N+1)th data PDATA<N+1> are performed if the cache buffer 320 is empty. This is because the internal data RDATA is read from the memory array 300 to the cache buffer 320 and the Nth data PDATA<N> or the (N+1)th data PDATA<N+1> may be received from the outside through the cache buffer 320.

Furthermore, a region of the memory array 300 into which the Nth data PDATA<N> may be programmed, a region of the memory array 300 into which the (N+1)th data PDATA<N+1> may be programmed, and a region of the memory array 300 from which the internal data RDATA may be read are different. For example, assuming that the region of the memory array 300 into which the Nth data PDATA<N> is programmed is a No. 10 page region, the region of the memory array 300 into which the (N+1)th data PDATA<N+1> may be programmed may be a No. 21 page region and the region of the memory array 300 from which the internal data RDATA may be read may be a No. 45 page region.

Figure 4:
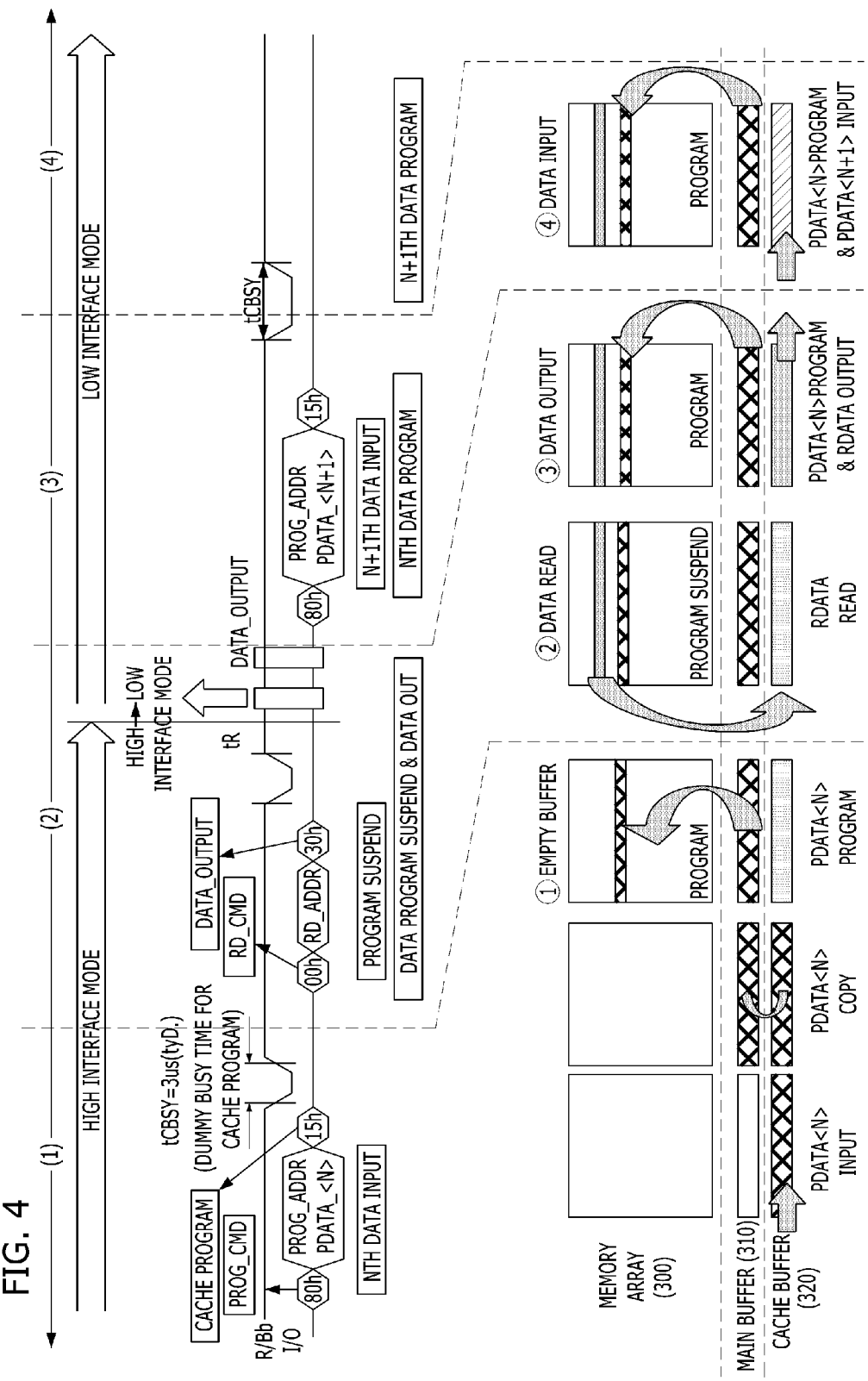
FIG. 4 is a diagram illustrating an operation of the non-volatile memory device of FIG. 3.

FIG. 4 is a diagram illustrating an operation of the non-volatile memory device of FIG. 3 in accordance with the first exemplary implementation of the present invention.

Referring to FIG. 4, the exemplary non-volatile memory device shown in FIG. 3 may start (1) its operation in a high interface mode. If a read operation or a data input operation is redundantly performed during a program operation, however, then the non-volatile memory device may switch from the high interface mode and operate in a low interface mode (2, 3).

More particularly, if a value (e.g., 80h) corresponding to the program command PROG_CMD, a program address PROG_ADDR, Nth data PDATA<N>, and a value (e.g., 15h) corresponding to a cache program command CACHE PROGRAM are inputted from the outside, then the Nth data PDATA<N> may be latched in the cache buffer 320 (PDATA<N> INPUT). The Nth data PDATA<N> that is latched in the cache buffer 320, as described above, may be copied to the main buffer 310 (PDATA<N> COPY). The Nth data PDATA<N> that is copied to the main buffer 310 may be programmed into the memory array 300 (PDATA<N> PROGRAM). Here, it can be seen that tCBSY, that is, the time that must be secured for a cache program operation, is relatively short (e.g., about 3 μs) because the non-volatile memory device operates in the high interface mode.

If a value (e.g., 00h) corresponding to a read command RD_CMD, a read address RD_ADDR, and a value (e.g., 30h) corresponding to a data output command DATA OUTPUT are inputted from the outside during an operation of programming the Nth data PDATA<N>, then the operation of programming the Nth data PDATA<N> into the memory array 300 may be first suspended (PROGRAM SUSPEND). Next, internal data RDATA stored in the memory array 300 may be read and latched in the cache buffer 320 (RDATA READ). In this case, if entering a section in which the operation to read the internal data RDATA (RDATA READ) is performed immediately after the operation of programming the Nth data PDATA<N> into the memory array 300 is suspended (PROGRAM SUSPEND), then the non-volatile memory device may switch from the high interface mode to the low interface mode (HIGH→LOW INTERFACE MODE). If the non-volatile memory device switches from the high interface mode to the low interface mode, as described above, then an increase of an instant peak current attributable to the operation to read the internal data RDATA in the state in which the program operation has been suspended may be suppressed.

In response to the completion of the operation to read the internal data RDATA in the low interface mode, the suspension of the operation of programming the Nth data PDATA<N> may be terminated and thus, the operation of programming the Nth data PDATA<N> may be performed. Furthermore, if the operation of programming the Nth data PDATA<N> is performed, then an operation of outputting the internal data RDATA read in the cache buffer 320 may be performed at the same time (PDATA<N> PROGRAM & RDATA OUTPUT).

Meanwhile, in FIG. 4, immediately after the operation of outputting the internal data RDATA read in the cache buffer 320 in a section in which the operation of programming the Nth data PDATA<N> is performed (PDATA<N> PROGRAM & RDATA OUTPUT), a value (e.g., 80h), corresponding to a program command PROG_CMD, a program address PROG_ADDR, (N+1)th data PDATA<N+1>, and a value (e.g., 15h), corresponding to a cache program command CACHE PROGRAM, must be inputted from the outside before the operation of programming the Nth data PDATA<N> is completed. That is, an operation to receive the (N+1)th data PDATA<N+1> must be performed during the operation of programming the Nth data PDATA<N>. As a result, during the operation of programming the Nth data PDATA<N>, the internal data RDATA may be redundantly outputted to the outside and the (N+1)th data PDATA<N+1> is redundantly latched in the empty cache buffer 320 (PDATA<N> PROGRAM & PDATA<N+1> INPUT). The (N+1)th data PDATA<N+1>, latched in the cache buffer 320, as described above, may be copied to the main buffer 310 after the operation of programming the Nth data PDATA<N> into the memory array 300 is terminated. The (N+1)th data PDATA<N+1>, which is copied to the main buffer 310, may be programmed into the memory array 300 (4). In this case, in FIG. 4, it can be seen that tCBSY, that is, the time that must be secured for the cache program operation, is longer than the time in the high interface mode, because an operation of the non-volatile memory device switching to the high interface mode again after switching to the low interface mode is not included. For reference, as described above with reference to FIG. 3, prior to the start of the operation of programming the (N+1)th data PDATA<N+1>, and after the operation of programming the Nth data PDATA<N> is completed, the non-volatile memory device may switch from the low interface mode to the high interface mode and operate. Here, a point of time at which the non-volatile memory device may switch from the low interface mode to the high interface mode may be selected based on the requirements of the non-volatile memory device.

The exemplary non-volatile memory device may switch from the high interface mode to the low interface mode only in a section in which an operation to read the data RDATA from the memory array 300 and outputting the read data RDATA or an operation to receive the (N+1)th data PDATA<N+1> needs to be performed in parallel with an operation of programming the Nth data PDATA<N>. The non-volatile memory device may continue to operate in the high interface mode in the other sections. Accordingly, an increase of an instant peak current can be prevented. Furthermore, if the operation to read the data RDATA from the memory array 300 and outputting the read data RDATA needs to be performed during an operation of programming specific data, then the operation of programming the specific data is temporarily suspended only in the section in which the data RDATA is read from the memory array 300, and the suspended operation of programming the specific data is subsequently performed in the operation of outputting the internal data RDATA, with the result that the operation to read the data RDATA from the memory array 300 and outputting the read data RDATA can be performed during the operation of programming the specific data.

Figure 5:
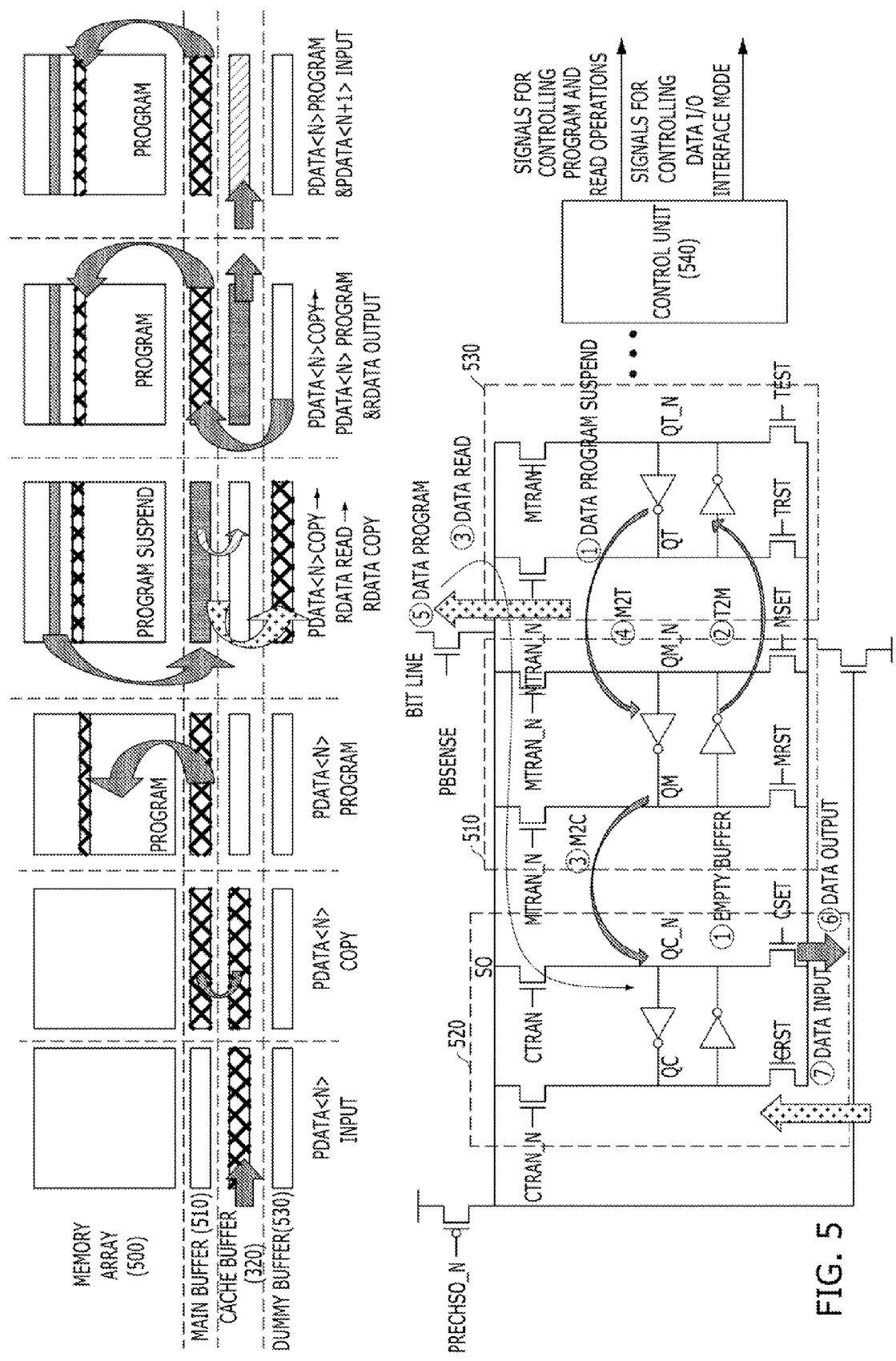
FIG. 5 is a diagram showing an exemplary non-volatile memory device.

FIG. 5 is a diagram showing an exemplary non-volatile memory device.

Referring to FIG. 5, the exemplary non-volatile memory device may include a memory array 500, a main buffer 510, a cache buffer 520, a dummy buffer 530, and a control unit 540.

The memory array 500 may store data by the page and may input and output data through a data program operation and a data read operation with the main buffer 510. For reference, in the conventional art, the non-volatile memory has been illustrated as being a NAND flash memory device, but this is only illustrative. A memory array 500, of the exemplary non-volatile memory device, may include NAND flash memory cells, NOR flash memory cells, or the memory cells of non-volatile memory devices, such as PRAM MRAM, or RRAM.

The main buffer 510 may program Nth data PDATA<N> or (N+1)th data PDATA<N+1>, which may be continuous lyreceived from the outside, into the memory array 500 or to read internal data RDATA from the memory array 500. That is, if the Nth data PDATA<N> has been latched in the main buffer 510, then the main buffer 510 may store the Nth data PDATA<N> in the memory array 500 in a program operation section. Likewise, if the (N+1)th data PDATA<N+1> has been latched in the main buffer 510, the main buffer 510 may store the (N+1)th data PDATA<N+1> in the memory array 500 in a program operation section. Furthermore, if the main buffer 510 is empty, then the main buffer 510 may read the internal data RDATA from the memory array 500 in a read operation section and latch the read internal data RDATA.

The cache buffer 520 may copy the Nth data PDATA<N> or the (N+1)th data PDATA<N+1> and the internal data RDATA to and from the main buffer 510, receive the externally received Nth data PDATA<N> or (N+1)th data PDATA<N+1> and output the internal data RDATA, copied from the main buffer 510 to the outside. More particularly, if the cache buffer 520 is empty and the Nth data PDATA<N> or the (N+1)th data PDATA<N+1> is received from the outside, then the cache buffer 520 may latch the received Nth data PDATA<N> or (N+1)th data PDATA<N+1>. The Nth data PDATA<N> or the (N+1)th data PDATA<N+1> latched in the cache buffer 520, as described above, may be copied to and from the main buffer 510. Furthermore, if the cache buffer 520 is empty, then the cache buffer 520 may copy the internal data RDATA, read from the memory array 500 to the main buffer 510, in a read operation section and latch the copied internal data RDATA. After the internal data RDATA is latched in the cache buffer 520, as described above, the cache buffer 520 may output the internal data RDATA to the outside in a data output operation section.

The dummy buffer 530 may copy the Nth data PDATA<N> or the (N+1)th data PDATA<N+1> to and from the main buffer 510 and latch the copied Nth data PDATA<N> or (N+1)th data PDATA<N+1>. That is, if the dummy buffer 530 is empty, then the dummy buffer 530 may copy the Nth data PDATA<N> or the (N+1)th data PDATA<N+1>, latched in the main buffer 510, and latch the copied Nth data PDATA<N> or (N+1)th data PDATA<N+1>.

The control unit 540 may perform an operation of programming the Nth data PDATA<N> or the (N+1)th data PDATA<N+1> and an operation to read the internal data RDATA in a high interface mode, in response to a program command PROG_CMD and a read command RD_CMD. If an operation to read the internal data RDATA or an operation to receive the (N+1)th data PDATA<N+1> is performed during the operation of programming the Nth data PDATA<N> then the control unit 540 may switch the non-volatile memory device from the high interface mode to a low interface mode. More particularly, in response to the program command PROG_CMD, the control unit 540 may copy the Nth data PDATA<N> or the (N+1)th data PDATA<N+1>, supplied to the cache buffer 520, to the main buffer 510 and may then program the Nth data PDATA<N> or the (N+1)th data PDATA<N+1> into the memory array 500 in the high interface mode. Furthermore, in response to the read command RD_CMD, the control unit 540 may read the internal data RDATA in the main buffer 510, may copy the read internal data RDATA to the cache buffer 520, and may then output the copied internal data RDATA to the outside in the high interface mode. However, if an operation to read the internal data RDATA is performed during the operation of programming the Nth data PDATA<N>, then the control unit 540 may suspend the operation of programming the Nth data PDATA<N>, may switch the non-volatile memory device from the high interface mode to the low interface mode, and may perform an operation of copying the Nth data PDATA<N>, stored in the main buffer 510, to the dummy buffer 530, and may then read the internal data RDATA in the main buffer 510. Thereafter, when the operation to read the internal data RDATA is completed, the control unit 540 may switch the non-volatile memory device from the low interface mode to the high interface mode again, may copy the Nth data PDATA<N> stored in the dummy buffer 530 to the main buffer 510, and may then perform the suspended operation of programming the Nth data PDATA<N>. Here, the reason why the operation of programming the Nth data PDATA<N> is suspended and the Nth data PDATA<N>, stored in the main buffer 510, is copied to the dummy buffer 530 prior to the operation section in which the internal data RATA is read in the main buffer 510, is that the program operation and the read operation are performed between only the memory array 500 and the main buffer 510. That is, this is because a program operation and a read operation cannot be performed at the same time between the memory array 500 and the main buffer 510. Furthermore, the reason why the non-volatile memory device switches from the high interface mode to the low interface mode is that a peak current can instantly increase if the read operation is redundantly performed during the suspension of the program operation in a high-speed operating state. Furthermore, if an operation to receive the (N+1)th data PDATA<N+1> needs to be performed during the operation of programming the Nth data PDATA<N>, then the control unit 540 may switch the non-volatile memory device from the high interface mode to the low interface mode and may perform the operation to receive the (N+1)th data PDATA<N+1. After the operation to receive the (N+1)th data PDATA<N+1> is completed, the control, unit 540 may switch the non-volatile memory device from the low interface mode to the high interface mode again. Here, the reason why the operation of programming the Nth data PDATA<N> does not need to be suspended in the operation section in which the (N+1)th data PDATA<N+1> is received, is that the operation of programming the Nth data PDATA<N> is an operation performed between the main buffer 510 and the memory array 500 and the operation to receive the (N+1)th data PDATA<N+1> is an operation performed between the cache buffer 520 and the outside of the non-volatile memory device. Furthermore, the reason why the non-volatile memory device switches from the high interface mode to the low interface mode is that a peak current can instantly increase if the program operation and the data input operation are performed at the same time in a high-speed operating state.

Here, the operation of the control unit 540, which switches the non-volatile memory device from the high interface mode to the low interface mode and then switches the non-volatile memory device from the low interface mode to the high interface mode, may be provided in such a manner that the frequency of an operating clock is shifted in the state in which the operation has been synchronized with the operating clock. Furthermore, the operation of the control unit 540, which switches the non-volatile memory device from the high interface mode to the low interface mode, and then switches the non-volatile memory device from the low interface mode to the high interface mode again, may be provided in such a manner that the non-volatile memory device is slowly driven in the state in which the operation has not been synchronized with an operating clock. That is, if an internal operation is slowly performed irrespective of a toggling of an operating clock while the non-volatile memory device operates in the low interface mode, an increase of a peak current attributable to the suspension of a program operation, the redundant execution of a read operation or the redundant execution of a program operation and a data input operation may be suppressed, even in a state in which the operating clock has a high frequency. Here, the non-synchronization state with the toggling of the operating clock is performed only in the low interface mode. If the non-volatile memory device switches from the low interface mode to the high interface mode, then the operation will be synchronized with the operating clock again and performed.

Furthermore, the internal data RDATA, read in the main buffer 510 and then copied to the cache buffer 520 in the section in which the operation of programming the Nth data PDATA<N> is suspended by the control unit 540, may be outputted to the outside after an operation of copying the Nth data PDATA<N> from the dummy buffer 530 to the main buffer 510 and programming the copied Nth data PDATA<N>. That is, the operation of programming the Nth data PDATA<N> and the operation of outputting the internal data RDATA to the outside may be redundantly performed. In this case, the non-volatile memory device does not need to operate in the low interface mode because an increase of an instant peak current due to the redundant operations is not so great. If the operation of switching the non-volatile memory device from the low interface mode to the high interface mode is not easily performed with sufficient speed during the program operation started again after the program operation is suspended, then the operation of programming the Nth data PDATA<N> and the operation of outputting the internal data RDATA to the outside may be redundantly performed in the low interface mode.

In summary, if the internal data RDATA needs to be read or the (N+1)th data PDATA<N+1> needs to be received during an operation of programming the Nth data PDATA<N>, then the non-volatile memory device may switch from the high interface mode to the low interface mode in order to suppress an increase of an instant peak current. A point of time at which the operation of switching the non-volatile memory device from the low interface mode to the high interface mode again is performed may be selected based on the requirements of the non-volatile memory device.

Furthermore, the (N+1)th data PDATA<N+1>, inputted to the cache buffer 520, may be copied to the main buffer 510 and programmed into the memory array 500, after the operation of programming the Nth data PDATA<N> is terminated. This means that the (N+1)th data PDATA<N+1> may remain latched in the cache buffer 520 in an operation section in which the Nth data PDATA<N> is programmed. In the state in which data has been latched in the cache buffer 520 as described above, an operation of additionally inputting/outputting data to/from the cache buffer 520 cannot be performed. That is, the operation to receive the Nth data PDATA<N> or the (N+1)th data PDATA<N+1> is performed if the cache buffer 520 is empty. This is because the Nth data PDATA<N> or the (N+1)th data PDATA<N+1> may be received from the outside through the cache buffer 520.

Furthermore, a region of the memory array 500 into which the Nth data PDATA<N> may be programmed, a region of the memory array 500 into which the (N+1)th data PDATA<N+1> may be programmed, and a region of the memory array 500 from which the internal data RDATA maybe read are different. For example, assuming that the region of the memory array 500 into which the Nth data PDATA<N> may be programmed is a No. 10 page region, the region of the memory array 500 into which the (N+1)th data PDATA<N+1> may be programmed may be a No. 21 page region and the region of the memory array 500 from which the internal data RDATA may be read may be a No. 45 page region.

As shown in FIG. 5, the exemplary non-volatile memory device may include the dummy buffer 530. The dummy buffer 530 is essential for a specific type of a non-volatile memory device, in which the cache buffer 520 does not directly read the internal data RDATA from the memory array 500. That is, the dummy buffer 530 is essential in a non-volatile memory device, in which the memory array 500 is configured to be performed only through the main buffer 510 and an operation of inputting/outputting data to/from the outside is configured to be performed only through the cache buffer 520.

Furthermore, the dummy buffer 530 may be used for a data back-up purpose. That is, as described above with reference to FIG. 3, in a non-volatile memory device, in which the cache buffer 520 can directly read the internal data RDATA from the memory array 500, the Nth data PDATA<N>, which is previously programmed in a section in which a program operation was suspended, may remain stored in the main buffer 510. At this time, in order to determine whether or not a value of the Nth data PDATA<N>, stored in the main buffer 510 in the section in which the program operation was suspended has been undesirably changed, the Nth data PDATA<N>, supplied to the cache buffer 520 before the program operation is performed, may be stored in the main buffer 510 and the dummy buffer 530 at the same time, and values of the Nth data PDATA<N>, stored in the main buffer 510 and the dummy buffer 530, are compared with each other after the suspended program operation is released. In this case, a phenomenon in which a data loss due to the suspension of the program operation may be prevented.

Figure 6:
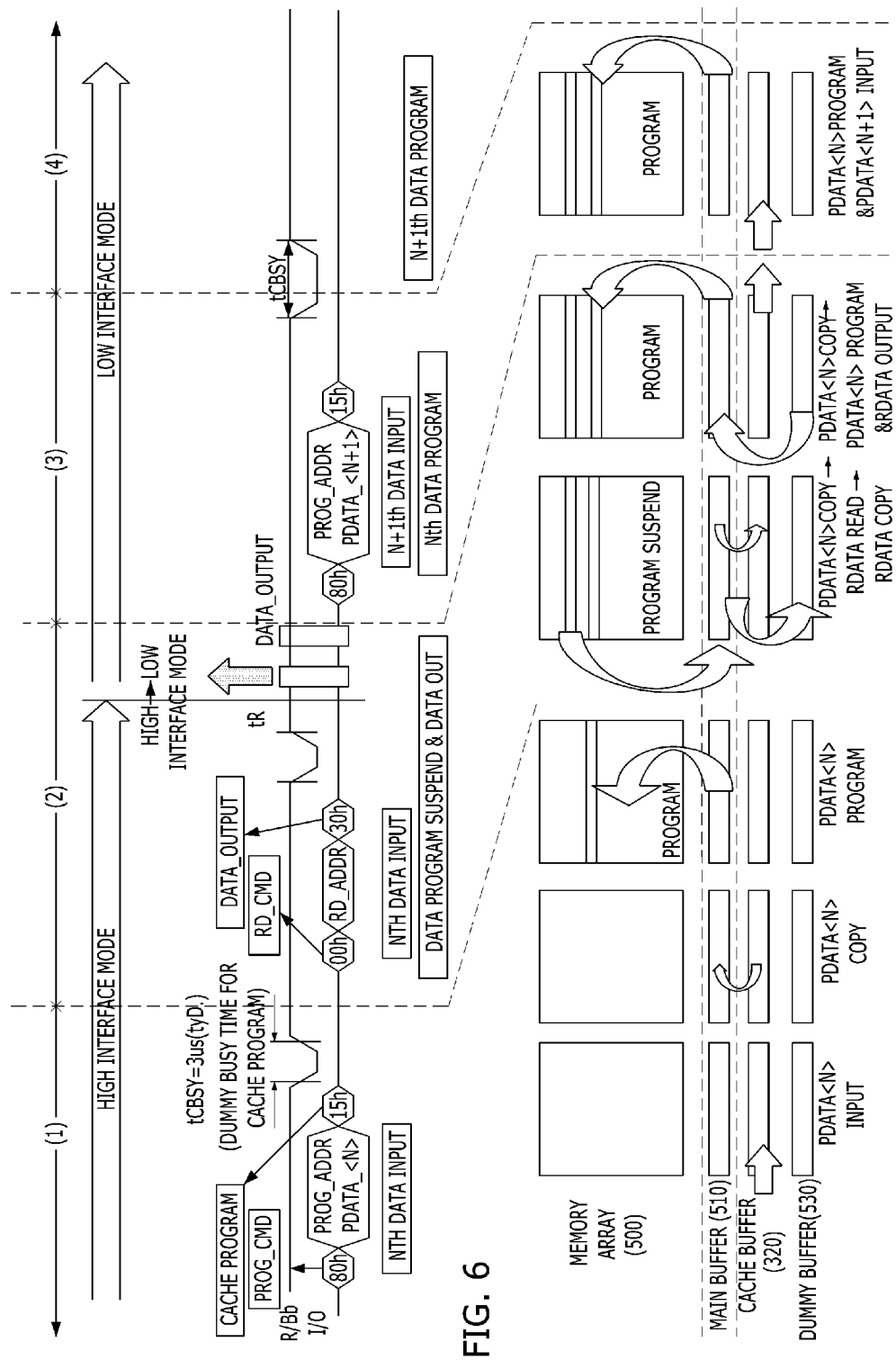
FIG. 6 is a diagram illustrating an operation of the non-volatile memory device of FIG. 5.

FIG. 6 is a diagram illustrating an operation of the exemplary non-volatile memory device of FIG. 5.

Referring to FIG. 6, the operation of the exemplary non-volatile memory device starts (1) its operation in a high interface mode. If a read operation or a data input operation is redundantly performed during a program operation, however, the non-volatile memory device may switch from the high interface mode to a low interface mode and operates (2, 3).

More particularly, if a value (e.g., 80h), corresponding to the program command PROG_CMD, a program address PROG_ADDR, Nth data PDATA<N>, and a value (e.g. 15h), corresponding to a cache program command CACHE PROGRAM, are inputted from the outside, the Nth data PDATA<N> may be latched in the cache buffer 520 (PDATA<N> INPUT). The Nth data PDATA<N>, latched in the cache buffer 520, as described above, may be to the main buffer 510 (PDATA<N> COPY). The Nth data PDATA<N> that is copied to the main buffer 510 may be programmed into the memory array 500 (PDATA<N> PROGRAM). Here, it can be seen that tCBSY, that is, the time that must be secured for a cache program operation, is relatively short (e.g., 3 μs) because the non-volatile memory device operates in the high interface mode.

If a value (e.g., 00h), corresponding to a read command RD_CMD, a read address RD_ADDR, and a value (e.g., 30h), corresponding to a data output command DATA OUTPUT, are inputted from the outside during an operation of programming the Nth data PDATA<N>, then the operation of programming the Nth data PDATA<N> into the memory array 500 is first suspended (PROGRAM SUSPEND). Next, the Nth data PDATA<N> that is stored in the main buffer 510, and used in the program operation, may be copied to the dummy buffer 530, the internal data RDATA that is stored in the memory array 500 may be read in the main buffer 510, and the read internal data RDATA may be copied to the cache buffer 520 and latched therein (PDATA<N> COPY→RDATA READ→RDATA COPY). In this case, if entering a section in which the operation to read the internal data RDATA (RDATA READ) may be performed after the operation of programming the Nth data PDATA<N> into the memory array 500 is suspended (PROGRAM SUSPEND), then the non-volatile memory device may switch from the high interface mode to the low interface mode (HIGH→LOW INTERFACE MODE). If the non-volatile memory device switches from the high interface mode to the low interface mode as described above, an increase of an instant peak current attributable to the operation to read the internal data RDATA in the state in which the program operation has been suspended can be suppressed.

In response to the completion of the operation to read the internal data RDATA in the low interface mode, the suspension of the operation of programming the Nth data PDATA<N> may be terminated and thus, the operation of programming the Nth data PDATA<N> may be performed. That is, the Nth data PDATA<N> that is stored in the dummy buffer 530 may be copied to the main buffer 510 again, and an operation of programming the copied Nth data PDATA<N> into the memory array 500 may be performed. Furthermore, if the operation of programming the Nth data PDATA<N> is performed, then an operation of outputting the internal data RDATA copied to and latched in the cache buffer 520 may be performed at the same time (PDATA<N> COPY→PDATA<N> PROGRAM & RDATA OUTPUT).

Meanwhile, in FIG. 6, immediately after the operation of outputting the internal data RDATA copied to and latched in the cache buffer 520 in a section in which the operation of programming the Nth data PDATA<N> is subsequently performed (PDATA<N> COPY→PDATA<N> PROGRAM & RDATA OUTPUT), a value (e.g., 80h), corresponding to a program command PROG_CMD, a program address PROG_ADDR, (N+1)th data PDATA<N+1>, and a value (e.g., 15h), corresponding to a cache program command CACHE PROGRAM, must be inputted from the outside before the operation of programming the Nth data PDATA<N> is completed. That is, an operation to receive the (N+1)th data PDATA<N+1> must be to be performed during the operation of programming the Nth data PDATA<N>. As a result, during the operation of programming the Nth data PDATA<N>, the internal data RDATA may be redundantly outputted to the outside and the (N+1)th data PDATA<N+1> may be redundantly latched in the empty cache buffer 520 (PDATA<N> PROGRAM & PDATA<N+1> INPUT). The (N+1)th data PDATA<N+1> that is latched in the cache buffer 520, as described above, may be copied to the main buffer 510 after the operation of programming the Nth data PDATA<N> into the memory array 500 is terminated. The (N+1)th data PDATA<N+1> that is copied to the main buffer 510 is programmed into the memory array 500 (4). In this case, in FIG. 6, it can be seen that tCBSY, that is, the time that must be unconditionally secured for the cache program operation, is longer than the existing time in the high interface mode because an operation of the non-volatile memory device switching to the high interface mode again after switching to the low interface mode is not included. For reference, as described above with reference to FIG. 5, prior to the start of the operation of programming the (N+1)th data PDATA<N+1> and after the operation of programming the Nth data PDATA<N> is completed, the non-volatile memory device may switch from the low interface mode to the high interface mode and operate. Here, a point of time at which the non-volatile memory device may switch from the low interface mode to the high interface mode may be selected based on the requirements of the non-volatile memory device.

The exemplary implementation non-volatile memory device may switch from the high interface mode to the low interface mode only in a section in which an operation to read the data RDATA from the memory array 500 and outputting the read data RDATA or an operation to receive the (N+1)th data PDATA<N+1> needs to be performed in parallel with an operation of programming the Nth data PDATA<N> and the non-volatile memory device operates in the high interface mode in the other sections. Accordingly, an increase of an instant peak current can be prevented. Furthermore, if the operation to read the data RDATA from the memory array 500 and outputting the read data RDATA needs to be performed during an operation of programming specific data, the operation of programming the specific data may be temporarily suspended only in the section in which the data RDATA is read from the memory array 500, and the suspended operation of programming the specific data may be subsequently performed in the operation of outputting the internal data RDATA, with the result that the operation to read the data RDATA from the memory array 500 and outputting the read data RDATA may be performed during the operation of programming the specific data.

Figure 7:
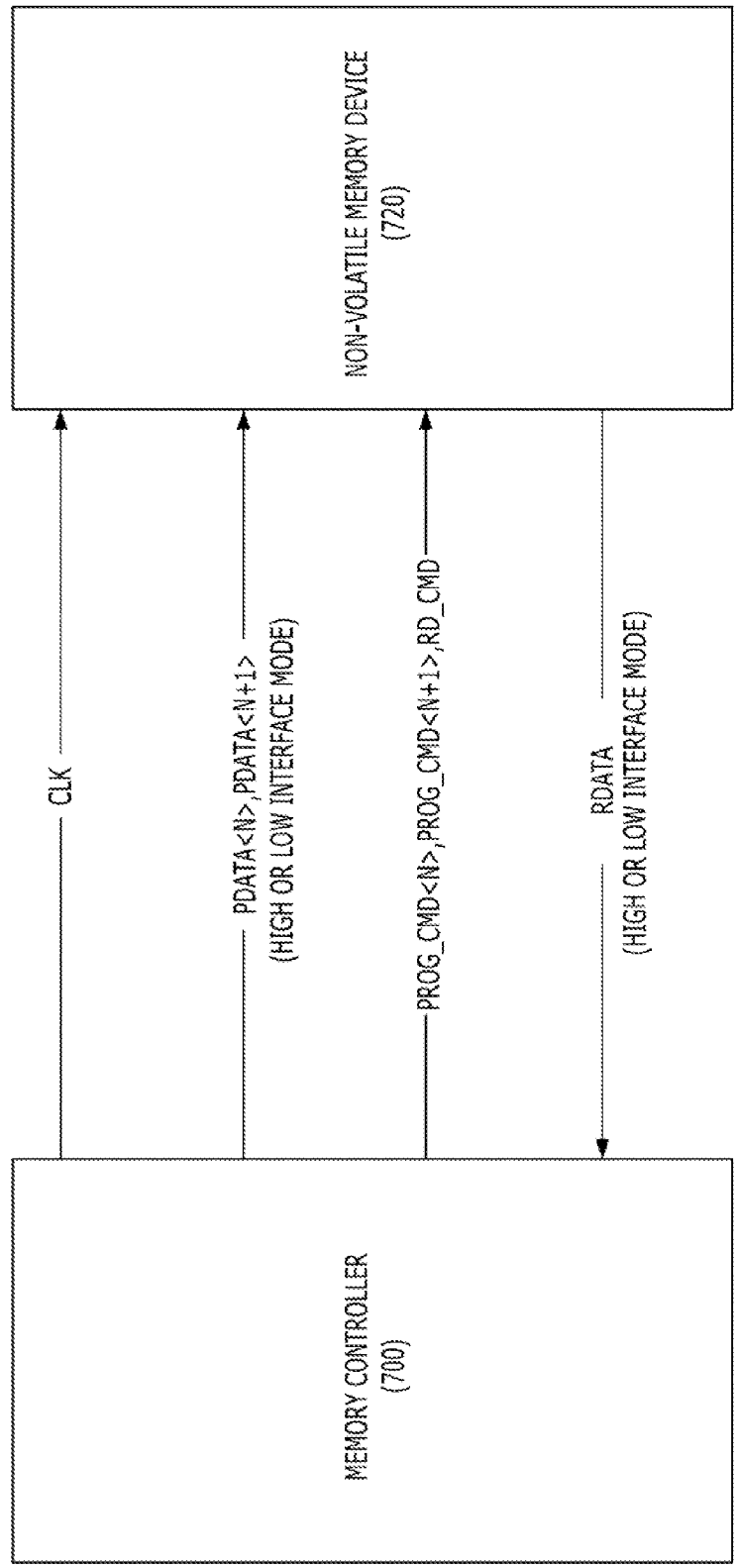
FIG. 7 is a diagram showing the construction of a non-volatile memory system including the non-volatile memory devices of FIGS. 3 and 5.

FIG. 7 is a diagram showing the construction of an exemplary non-volatile memory system including the exemplary non-volatile memory devices of FIGS. 3 and 5.

More particularly, the exemplary non-volatile memory system of FIG. 7 may include a memory controller 700 and a non-volatile memory device 720.

The memory controller 700 may send commands PROG_CMD<N>, PROG_CMD<N+1>, and RD_CMD to control the non-volatile memory device 720 to perform a program operation or a read operation. Here, an Nth program command PROG_CMD<N>, together with Nth data PDATA<N>, may be transferred from the memory controller 700 to the non-volatile memory device 720 so that an Nth program operation may be performed. Likewise, an (N+1)th program command PROG_CMD<N+1 together with (N+1)

th data PDATA<N+1>, may be transferred from the memory controller 700 to the non-volatile memory device 720 so that an (N+1)th program operation may be performed. Here, N is an integer greater than 1. Furthermore, if the read command RD_CMD is transferred from the memory controller 700 to the non-volatile memory device 720 then the non-volatile memory device 720 may read data RDATA stored therein and outputs the read data RDATA to the memory controller 700.

That is, the non-volatile memory device 720 may perform a program operation in response to the program command PROG_CMD<N> or PROG_CMD<N+1> of the memory controller 700 and may perform a read operation in response to the read command RD_CMD of the memory controller 700.

Here, the program data PDATA<N> and PDATA<N+1> and the read data RDATA that is exchanged between the memory controller 700 and the non-volatile memory device 720 are transmitted in the high interface mode. For example, the program data PDATA<N> and PDATA<N+1> and the read data RDATA may be transmitted in the high interface mode by sending the program data and the read data in synchronism with an operating clock CLK that is toggled at high speed.

If the non-volatile memory device 720 has to perform an operation to read the internal data RDATA in response to the read command RD_CMD while performing an operation of programming the Nth data PDATA<N> in response to the Nth program command PROG_CMD<N> or both the (N+1)th program command PROG_CMD<N+1> and the (N+1)th data PDATA<N+1> need to be inputted to the non-volatile memory device 720, however, the non-volatile memory device 720 may switch from the high interface mode to the low interface mode. For example, in the low interface mode, a method of controlling toggling speed of the operating dock CLK so that it is slower than previous toggling speed may be used. Furthermore, a method of maintaining speed in the high interface mode but more slowly performing a program operation, a read operation, and a data input operation irrespective of the toggling of the operating clock CLK within the non-volatile memory device 720 may be used. That is, if the non-volatile memory device 720 enters the low interface mode, the non-volatile memory device 720 may perform the program operation, the read operation, and the data input operation slowly irrespective of the toggling of the operating clock CLK. Accordingly, although the operating clock CLK has a high frequency, an increase of a peak current due to the redundant execution of the program operation and the read operation or the redundant execution of the program operation and the data input operation may be suppressed. In this case, the execution of the program operation, the read operation, and the data input operation, in the state in which the operations are not synchronized with the operating clock CLK within the non-volatile memory device 720, are performed only in the low interface mode. Thereafter, if the non-volatile memory device 720 switches from the low interface mode to the high interface mode, the program operation, the read operation, and the data input operation will operate in synchronism with the operating clock CLK.

In order for the memory controller 700 and the non-volatile memory device 720 to alternately operate in the high interface mode and the low interface mode, as described above, the memory controller 700 needs to be able to determine that the non-volatile memory device 720 now operates in what interface operation mode.

To this end, a method of sending a signal (not shown) indicative of an interface operation mode from the non-volatile memory device 720 to the memory controller 700 may be used. This method, however, may not be an efficient method because an additional transfer line is necessary between the memory controller 700 and the non-volatile memory device 720.

Alternatively, the memory controller 700 may determine that the non-volatile memory device 720 now operates in what interface operation mode as follows.

First, if a point of time, at which the read command RD_CMD to read the data RDATA stored in the non-volatile memory device 720 is transmitted, or at a point of time at which the (N+1)th program command PROG_CMD<N+1> and the (N+1)th data PDATA<N+1> are transmitted, maintains a set time difference on the basis of a point of time, at which the Nth program command PROG_CMD<N> and the Nth data PDATA<N> are transmitted from the memory controller 700 to the non-volatile memory device 720, it can be determined that the memory controller 700 and the non-volatile memory device 720 input/output data in the high interface mode.

If a point of time, at which the read command RD_CMD to read the data RDATA stored in the non-volatile memory device 720 is transmitted, or at a point of time at which the (N+1)th program command PROG_CMD<N+1> and the (N+1)th data PDATA<N+1> are transmitted, does not maintain a set time difference on the basis of a point of time, at which the Nth program command PROG_CMD<N> and the Nth data PDATA<N> are transmitted from the memory controller 700 to the non-volatile memory device 720, it may be determined that the memory controller 700 and the non-volatile memory device 720 input/output data in the low interface mode. Here, a criterion to determine a section in which the low interface mode may be sustained may be from the point of time, at which the read command RD_CMD is transmitted from the memory controller 700 to the non-volatile memory device 720 to a point of time, at which the non-volatile memory device 720 may read the internal data RDATA and output the read internal data RDATA to the memory controller 700. Likewise, a criterion to determine a section in which the low interface mode may be sustained may be from the point of time, at which the (N+1)th program command PROG_CMD<N+1> and the (N+1)th data PDATA<N+1> are transmitted, to a point of time enough for the non-volatile memory device 720 to store the (N+1)th data PDATA<N+1>.

Here, the set time difference, that is a criterion on which the memory controller 700 determines an interface operation mode between the memory controller 700 and the non-volatile memory device 720, may be, for example, a minimum time defined in a specification and taken to program the Nth data PDATA<N> or the (N+1)th data PDATA<N+1>. Furthermore, the point of time may be enough for the non-volatile memory device 720 to store the (N+1)th data PDATA<N+1>. That is, a criterion to determine the section in which the low interface mode may be sustained, means a minimum time that is necessary for the (N+1)th data PDATA<N+1> to be applied to a buffer of the non-volatile memory device 720 and latched in the buffer.

For reference, the non-volatile memory device 720 disclosed in FIG. 7 may be implemented with the non-volatile memory devices of FIGS. 3 and 5, and a detailed description thereof is omitted for simplicity.

As described above, the non-volatile memory devices of FIGS. 3 and 5 can be applied to the non-volatile memory system as described with reference to FIG. 7.

FIG. 8 shows a table comparing the time necessary for a program operation with the time necessary for the input/ output of data in the operation of the exemplary non-volatile memory devices of FIGS. 3 to 7.

Referring to FIG. 8, assuming that the non-volatile memory device is a NAND flash memory device, program pulses are classified into first to third pulses PGM PV1 PULSE, PGM PV2 PULSE, and PGM PV3 PULSE.

The first program pulse PGM PV1 PULSE is repeated four times, and the time necessary for the repetition of the first program pulse is 453.2 µs.

The first program pulse PGM PV1 PULSE and the second program pulse PGM PV2 PULSE may be simultaneously repeated four times, and the time necessary for the repetition of the first and the second program pulses is 542 µs.

The first program pulse PGM PV1 PULSE, the second program pulse PGM PV2 PULSE, and the third program pulse PGM PV3 PULSE may be repeated twice, and the time necessary for the repetition of the first, the second, and the third program pulses is 293.2 µs.

The second program pulse PGM PV2 PULSE and the third program pulse PGM PV3 PULSE may be simultaneously repeated six times, and the time necessary for the repetition of the first and the third program pulses is 746.4 µs.

The third program pulse PGM PV3 PULSE may be repeated seven times, and the time necessary for the repetition of the first program pulse is 715.4 µs.

If a point of time at which a program operation is suspended is generated after the first program pulse PGM PV1 PULSE is fully repeated (EXEMPLARY IMPLEMENTATION 1), the time taken for the suspension of the program operation to be released and then for the program operation to be executed and completed is 715.4 µs+746.4 µs.

If a point of time at which the program operation is suspended is generated after the second program pulse PGM PV2 PULSE is fully repeated (EXEMPLARY IMPLEMENTATION 2), then the time taken for the suspension of the program operation to be released and then for the program operation to be executed and completed is 715.4 µs.

If a program operation is performed again after the suspension of the program operation on the Nth data PDATA<N> is released, then the internal data RDATA read in (copied) to the cache buffers 320 and 520 may be outputted (OUTPUT) and the time taken for the (N+1)th data PDATA<N+1> to be inputted (INPUT) immediately after the output of the internal data RDATA is 524.288 µs. As described above, it can be seen that the time taken for the internal data RDATA to be outputted and then the (N+1)th data PDATA<N+1> to be received is smaller than the time taken for a program operation to be executed again and completed irrespective of whether a point of time at which the program operation is suspended is the first program pulse PGM PV2 PULSE or the second program pulse PGM PV2 PULSE. That is, in the aforementioned exemplary implementations of the present invention, the input/output of data and a program operation may be simultaneously executed after the suspension of the program operation is released.

Likewise, if a program operation is performed again after the suspension of the program operation on the Nth data PDATA<N> is released, assuming that the cache buffer 320, 520 is empty, then the time taken for the (N+1)th data PDATA<N+1> to be inputted (INPUT) is 262.144 µs. As described above, it can be seen that the time taken for the (N+1)th data PDATA<N+1> to be received is smaller than the time taken for the program operation to be performed again and then completed irrespective of whether a point of time at which the program operation is suspended is the first program pulse PGM PV2 PULSE or the second program pulse PGM PV2 PULSE. That is, in the aforementioned exemplary implementations of the present invention, the input/output of data and a program operation may be simultaneously executed after the suspension of the program operation is released.

For example, the locations and types of a logic gate and a transistor illustrated in the aforementioned exemplary implementation may be differently implemented depending on the polarity of a signal.

In this technology, the non-volatile memory device may switch from a high interface mode to a low interface mode only in a section in which an operation to read internal data within the memory and outputting the read data or an operation to receive (N+1)th data need to be performed in parallel with an operation of programming the Nth data, and the non-volatile memory device operates in the high interface mode in the remaining sections. Accordingly, there is an advantage in that the amount of an instantly consumed current can be minimized.

Furthermore, in this technology, if an operation to read internal data within the memory and outputting the read internal data needs to be performed in parallel with a program operation, a program operation is temporarily suspended only in a section in which the internal data is read from the memory and the suspended program operation is performed in the operation of outputting the internal data. Accordingly, there is an advantage in that an operation to read internal data within the memory and outputting the read internal data can be performed in parallel with a program operation.

While the present invention has been described with respect to the specific exemplary implementations, it will be apparent to those skilled in the art that various changes and modifications may be made without departing from the spirit and scope of the invention as defined in the following claims.

What is claimed is:

1. A non-volatile memory system comprising: a memory controller suitable for controlling a memory; and
the memory suitable for performing read and program operations in response to commands from the memory controller, and
wherein the memory controller and the memory operate from a high interface mode switching to a low interface mode when an operation to read internal data or an operation to receive (N+1)th data is performed in parallel with an operation to program Nth data in the memory, where N is an integer great than 1.

2. The non-volatile memory system of claim 1, wherein:
when a point of time at which a read command to read the internal data is transmitted or a point of time at which the (N+1)th data for a program operation is transmitted maintains a set time difference based on a point of time at which the Nth data for a program operation is transmitted from the memory controller to the memory, the memory controller and the memory remain in the high interface mode, and
when the point of time at which the read command is transmitted or the point of time at which the (N+1)th data is transmitted does not maintain the set time difference based on the point of time at which the Nth data is transmitted, the memory controller and the memory switch from the high interface mode to a low interface mode from the point of time at which the read command is transmitted to a point of time at which the internal data within the memory is read and outputted or from the point of time at which the (N+1)th data is transmitted to a point of time enough for the (N+1)th data to be stored in the memory.

3. The non-volatile memory system of claim 1, wherein the memory comprises:
  a memory array;
  a main buffer suitable for programming the Nth or the (N+1)th data into the memory array;
  a cache buffer suitable for copying the Nth or the (N+1)th data to and from the main buffer, reading the internal data from the memory array, receiving the Nth or the (N+1)th data and outputting the internal data between the cache buffer and the memory controller; and
  a control unit suitable for controlling the operation to program the Nth or the (N+1)th data, the operation to read the internal data in response to the program command and the read command and an interface mode switching operation.

4. The non-volatile memory system of claim 3, wherein the control unit is suitable for:
  copying the Nth or the (N+1)th data, supplied to the cache buffer, to the main buffer and program the copied Nth or (N+1)th data into the memory array in the high interface mode in response to the program command,
  reading the internal data in the cache buffer and outputting the read internal data to the memory controller in the high interface mode in response to the read command,
  when the operation to read the internal data needs to be performed during the operation to program the Nth data, suspending the operation to program the Nth data, switching to the low interface mode, performing the operation to read the internal data, switching to the high interface mode after the operation to read the internal data is completed, and performing the suspended operation to program the Nth data, and
  when the operation to receive the (N+1)th data needs to be performed during the operation to program the Nth data, switching to the low interface mode, performing the operation to receive the (N+1)th data, and switching to the high interface mode after the operation to receive the (N+1)th data is completed.

5. The non-volatile memory system of claim 4, wherein:
  the internal data, which is read in the cache buffer in a section in which the operation to program the Nth data is suspended, is outputted to the memory controller in a section in which the operation to program the Nth data is subsequently performed, and
  the (N+1)th data inputted to the cache buffer is copied to the main buffer and programmed into the memory array after the operation to program the Nth data is terminated.

6. The non-volatile memory system of claim 5, wherein a region of the memory array into which the Nth data is programmed, a region of the memory array into which the (N+1)th data is programmed, and a region of the memory array from which the internal data is read are different.

7. The non-volatile memory system of claim 5, wherein the operation to program the Nth or the (N+1)th data, the operation to read the internal data, and the operation to receive the Nth or the (N+1)th data are performed when the cache buffer is empty.

8. The non-volatile memory system of claim 1, wherein the memory comprises:
  a memory array;
  a main buffer suitable for programming the Nth or the (N+1)th data into the memory array or reading the internal data from the memory array;
  a cache buffer suitable for copying the Nth or the (N+1)th data and the internal data to and from the main buffer, receiving the Nth or the (N+1)th data and outputting the internal data between the cache buffer and the memory controller;
  a dummy buffer suitable for copying the Nth or the (N+1)th data to and from the main buffer; and
  a control unit suitable for controlling the operation to program the Nth or the (N+1)th data, the operation to read the internal data in response to the program command and the read command and an interface mode switching operation.

9. The non-volatile memory system of claim 8, wherein the control unit is suitable for:
  Copying the Nth or the (N+1)th data, supplied to the cache buffer, to the main buffer and programming the copied Nth or (N+1)th data into the memory array in the high interface mode in response to the program command,
  reading the internal data in the main buffer, copying the read internal data to the cache buffer, and outputting the read internal data to the memory controller in the high interface mode in response to the read command,
  when the operation to read the internal data needs to be performed during the operation to program the Nth data, suspending the operation to program the Nth data, switching to the low interface mode, copying the Nth data stored in the main buffer to the dummy buffer, performing the operation to read the internal data, switching to the high interface mode after the operation to read the internal data is completed, copying the Nth data stored in the dummy buffer to the main buffer, and performing the suspended operation to program the Nth data, and
  when the operation to receive the (N+1)th data needs to be performed during the operation to program the Nth data, switching to the low interface mode, performing the operation to receive the (N+1)th data, and switching to the high interface mode after the operation to receive the (N+1)th data is completed.

10. The non-volatile memory system of claim 9, wherein:
  the internal data, which is read in the main buffer and copied to the cache buffer in a section in which the operation to program the Nth data is suspended, is outputted to the memory controller in a section in which the operation to program the Nth data is subsequently performed, and
  the (N+1)th data inputted to the cache buffer is copied to the main buffer and programmed into the memory array after the operation to program the Nth data is terminated.

11. The non-volatile memory system of claim 10, wherein a region of the memory array into which the Nth data is programmed, a region of the memory array into which the (N+1)th data is programmed, and a region of the memory array from which the internal data is read are different.

12. The non-volatile memory system of claim 10, wherein the operation to program the Nth or the (N+1)th data, the operation to read the internal data, and the operation to receive the Nth or the (N+1)th data are performed when the cache buffer is empty.

13. A non-volatile memory device comprising:
  a memory array;
  a main buffer suitable for programming Nth or (N+1)th data, continuously supplied externally, into the memory array, where N is an integer great than 1;
  a cache buffer suitable for copying the Nth or the (N+1)th data to and from the main buffer, reading internal data from the memory array, receiving the external Nth or the (N+1)th data, and outputting the internal data externally; and a control unit suitable for performing the operation to program the Nth or the (N+1)th data and the operation to read the internal data in a high interface mode in response to a program command and a read command, wherein the control unit switches to a low interface mode when the operation to read the internal data or the operation to receive the (N+1)th data needs to be performed in parallel with the operation to program the Nth data.

14. The non-volatile memory device of claim 13, wherein the control unit is suitable for:
copying the Nth or the (N+1)th data, supplied to the cache buffer, to the main buffer and programming the copied Nth or (N+1)th data into the memory array in the high interface mode in response to the program command,
reading the internal data in the cache buffer and outputting the read internal data externally in the high interface mode in response to the read command,
when the operation to read the internal data needs to be performed during the operation to program the Nth data, suspending the operation to program the Nth data, switching to the low interface mode, performing the operation to read the internal data, switching to the high interface mode after the operation to read the internal data is completed, and performing the suspended operation to program the Nth data, and
when the operation to receive the (N+1)th data needs to be performed during the operation to program the Nth data, switching to the low interface mode, performing the operation to receive the (N+1)th data, and switching to the high interface mode after the operation to receive the (N+1)th data is completed.

15. The non-volatile memory device of claim 14, wherein:
the internal data, which is read in the cache buffer in a section in which the operation to program the Nth data is suspended, is outputted externally in a section in which the operation to program the Nth data is subsequently performed, and
the (N+1)th data inputted to the cache buffer is copied to the main buffer and programmed into the memory array, after the operation to program the Nth data is terminated.

16. The non-volatile memory device of claim 15, wherein a region of the memory array into which the Nth data is programmed, a region of the memory array into which the (N+1)th data is programmed, and a region of the memory array from which the internal data is read are different.

17. The non-volatile memory device of claim 15, wherein the operation to program the Nth or the (N+1)th data, the operation to read the internal data, and the operation to receive the Nth or the (N+1)th data are performed when the cache buffer is empty.

18. A non-volatile memory device comprising:
a memory array;
a main buffer suitable for programming Nth or (N+1)th data, continuously supplied externally, into the memory array or reading internal data from the memory array, where N is an integer great than 1;
a cache buffer suitable for copying the Nth or the (N+1)th data and the internal data to and from the main buffer, receiving the external Nth or the (N+1)th data, and outputting the internal data externally;
a dummy buffer suitable for copying the Nth or the (N+1)th data to and from the main buffer; and
a control unit suitable for performing the operation to program the Nth or the (N+1)th data and the operation to read the internal data in a high interface mode in response to a program command and a read command, wherein the control unit switches to a low interface mode when the operation to read the internal data or the operation to receive the (N+1)th data needs to be performed in parallel with the operation to program the Nth data.

19. The non-volatile memory device of claim 18, wherein the control unit is suitable for:
copying the Nth or the (N+1)th data, supplied to the cache buffer, to the main buffer and program the copied Nth or (N+1)th data into the memory array in the high interface mode in response to the program command,
reading the internal data in the main buffer, copying the read internal data to the cache buffer, and outputting the read internal data externally in the high interface mode in response to the read command,
when the operation to read the internal data needs to be performed during the operation to program the Nth data, suspending the operation to program the Nth data, switching to the low interface mode, copying the Nth data stored in the main buffer to the dummy buffer, performing the operation to read the internal data, switching to the high interface mode after the operation to read the internal data is completed, copying the Nth data stored in the dummy buffer to the main buffer, and performing the suspended operation to program the Nth data, and
when the operation to receive the (N+1)th data needs to be performed during the operation to program the Nth data, switching to the low interface mode, performing the operation to receive the (N+1)th data, and switching to the high interface mode after the operation to receive the (N+1)th data is completed.

20. The non-volatile memory device of claim 19, wherein:
the internal data, which is read in the main buffer and copied to the cache buffer in a section in which the operation to program the Nth data is suspended, is outputted externally in a section in which the operation to program the Nth data is subsequently performed, and
the (N+1)th data inputted to the cache buffer is copied to the main buffer and programmed into the memory array after the operation to program the Nth data is terminated.

* * * * *